July 5, 1938.　　　　G. T. REICH　　　　2,122,586
PROCESS FOR THE PURIFICATION OF CO2
Filed Aug. 12, 1935
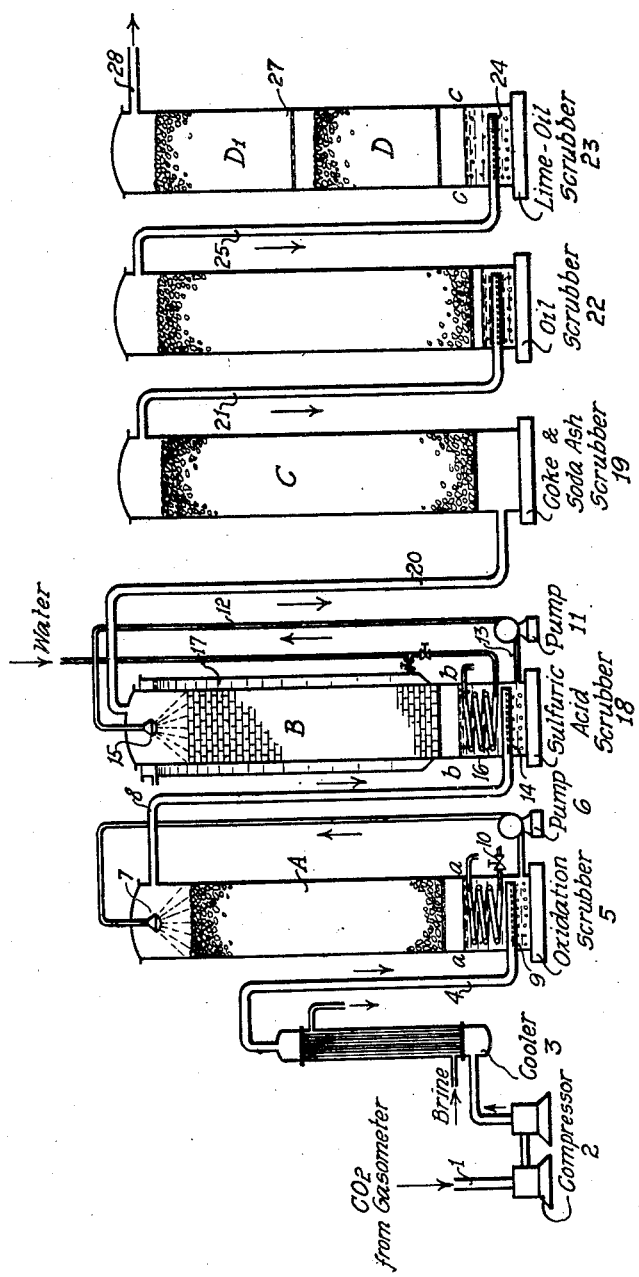
INVENTOR.
GUSTAVE T. REICH
BY
ATTORNEY.

Patented July 5, 1938

2,122,586

UNITED STATES PATENT OFFICE 2,122,586

PROCESS FOR THE PURIFICATION OF CO₂

Gustave T. Reich, Philadelphia, Pa.

Application August 12, 1935, Serial No. 35,715

6 Claims. (Cl. 23—150)

The instant invention relates to the purification of $CO_2$ gas; it comprises a removal, prior to the oxidizing step, of a substantial portion of the impurities; and also the removal of traces of sulphuric acid and sulphates after the sulphating step and in the later stages and the control of the sulphuric acid stage by checking the heat produced through the exothermic reactions occurring at this stage. It also relates to the apparatus used at this and any other stage where oxidation of impurities occurs; and other features that will become apparent as a skilled worker reads this specification. All of these features need not be employed always.

The equipment required for this process is not expensive and is durable. The cost of labor, of chemicals and general manufacturing costs are low, and the process is easily operated; and, looking at this mechanical equipment, the certainty of its operation and its guards against accidents and against lack of attentive oversight, are very important.

The $CO_2$ gas as first obtained from various raw materials, is usually not fit for commercial use. It may have to be dehydrated, deodorized, purified; concentrated, or some of these things must be done to it to produce a marketable product, and although there is much experimental art and literature on this subject, but very little commercial success has been attained. The use of pressure is very old. A pressure of up to 500 lbs. has been considered. Materials, such as activated charcoal, silica gel hexavalent chromium compounds and the like have been used in processes for purifying $CO_2$. My Patent No. 1,519,932 describes a practical process which contemplates that: the fermentation gas after having been scrubbed with water is purified, passes through an oxidizing medium such as a hexavalent chromium compound, afterwards through sulphuric acid, then into a coke tower provided with soda ash and ultimately through an oil scrubber. This is a series of stages that is correct chemically and is not departed essentially from in this process, and the instant process is an evolution from it.

In the instant process the $CO_2$ gas coming from the compressor is cleared of a great portion of its impurities before entering the oxidizing tower, by cooling the gas to a temperature of just above 0° C. This cooling will separate 50% or even 75% of the organic impurities from the $CO_2$ gas. This purification is effected because many of these impurities are contained in the $CO_2$ gas in a vapor form, but when cooled and compressed become liquefied and are deposited out from the gas. These impurities may be removed by, for instance, an outlet port 35, which is closable by a valve 36. An advantage of interposing the cooling stage before the oxidization is that the large amount of impurities is gotten rid of previously to oxidation, thus decreasing the cost of oxidizing materials in like proportion. Cooling the gas after oxidation and prior to the sulphuric acid stage would not effect this saving.

The $CO_2$ gas passes after this cooling and elimination to the oxidizing scrubber, which is cooled sufficiently, and contains a material that can oxidize the organic impurities remaining in the $CO_2$ gas. This material is preferably a hexavalent chromium compound. Preferably this material is contained at the bottom of a tank in a liquid condition, and the $CO_2$ gas is caused to pass through it. The mechanical structure of this apparatus is described in a following portion of my specification.

The $CO_2$ gas then passes through the sulphuric acid scrubber. This is cooled and the $CO_2$ gas passes preferably through this tower, also through liquid in the bottom. The construction of the preferred form of this scrubber is described in a following portion of my specification. It is cooled to prevent the warming of the $H_2SO_4$ during the exothermic reaction which takes place during the dehydration of the $CO_2$.

A subsequent scrubbing in a coke-soda ash scrubber and an oil tower may be the next stages of the process. These steps may be in addition to or may be substituted either wholly or partially by the stage which I will now describe.

The passage of $CO_2$ through $H_2SO_4$ is likely to entrain with it a trace of $H_2SO_4$ which will give an objectionable smell or taste to the $CO_2$ and render it unmarketable for edible purposes. A scrubber containing limestone, dolomite or similar material may have the $CO_2$ gas passed through it to remove the sulphur adulterants. The sulphuric acid unites with the lime etc., to form calcium or other sulphate.

However, as is well known, when an alkali earth compound such as limestone or dolomite is treated with sulphuric acid, the resulting calcium sulphate may swell gradually, preventing the circulation of gas, or the calcium sulphate may be converted into a fine powder, which, if carried, for instance, to a compressor of a $CO_2$ ice making machine, will do considerable damage. To meet this, I have found that by placing into the tower, together with the dolomite, etc. an odorless oil, such as is used for the CO₂ compressor and circulating it over the neutralizing agent (the dolomite, etc.) the H₂SO₄ is absorbed in the oil and neutralized by the neutralizing agent, and the fine powder produced stays in the oil.

The apparatus employed in this process in the oxidization and sulphuric acid stages has features especially suitable to carrying on this process hitherto described. They are illustrated partly diagrammatically.

The drawing shows the apparatus preferably used in the oxidation and H₂SO₄ stages of my process: 1 is the CO₂ inlet to the compressor 2 where the gas is compressed to at least 50 lbs. pressure. The compressed gas is cooled with water—a standard practice—and led into subcooler 3, where it is further cooled near 0° C. by means of brine or any conventional means. Gas conductor 4 leads to the oxidation scrubber 5 which is provided with a circulating pump 6 and sprayer 7 and CO₂ exit line 8. At the bottom of the scrubber is a receptacle 9 for the oxidizing agent in a liquid form; the normal liquid level being at the level indicated in the drawing by the line a—a, slightly above which the exit pipe enters the tower 5. The upper part of the scrubber is provided with tower filler of coke, A, or any suitable material. The liquid in the lower part contains the dissolved chemicals serving for oxidizing purposes. The CO₂ gas entering this tower passes first through the liquid and then through the scrubber, assuring a complete oxidation whether the pump is working or not. A cooling coil 10 is placed in the lower part of the tower. The entrance pipe 4 for the entering CO₂ dips well beneath the level a—a.

The H₂SO₄ scrubber 18 is similar in design to the oxidizing tower. It comprises pump 11, entrance liquid pipe 12, exit liquid pipe 13, bottom receptacle 14, gas entrance conductor 8, which leads to it from the oxidation scrubber, 5, and which dips well below the normal liquid level b—b, and the sprayer, 15, which sprinkles the coke or other filler B. This tower has additionally the coil, 16, through which cold water is driven and the jacket, 17, containing cold water, which will prevent overheating by the exothermic chemical action occurring within the tower.

The coke scrubber, 19, is provided with a CO₂ gas entrance conductor 20, which leads to it from the H₂SO₄ scrubber 18, and exit gas line, 21, and is provided with tower filler of coke C, which has been impregnated with a saturated solution of an alkali carbonate, where part of the entrained H₂SO₄ is neutralized.

The oil scrubber, 22, is similar in construction to the oxidizing tower, 5, without cooling coils. In small units, this oil scrubber can be omitted entirely; but preferably used in combination with lime-oil scrubber 23.

The lime-oil scrubber is provided with a shallow receptacle, 24, containing an odorless oil such as is used for the lubricating of the CO₂ compressors, and a gas conductor, 25, which leads to the lime-oil scrubber. The CO₂ gas entering through line 25, which dips below the normal oil level of c—c, passes into the upper part of the scrubber (D) preferably divided into sections separated by means of perforated plates, 27, and provided with tower filler consisting of an alkali earth material such as limestone or dolomite. Through the gas exit line 28, the odorless, tasteless, and neutral CO₂ gas is returned to the compressor for liquefying purposes.

An example of the carrying out of my invention, but not as limitations upon my invention, I give the following specimens.

*First example.*—1000 lbs. of carbon dioxide gas obtained by the fermentation of molasses, grain, etc., is washed with water, collected in the gasometer and compressed in a three-stage compressor—first to 75 lbs. pressure. The CO₂ gas passes first through a cooler—which is a standard practice, and may be cooled by means of water to 16° C. This pre-cooled CO₂ now is cooled further by means of brine of ammonia—say to 2° C. The cooler is provided with drain outlet, for the removal of a substantial amount of water, plus condensible organic impurities.

In my previous process, without after cooling to 2° C., it required, per ton of CO₂, almost 3–4 lbs. of a hexavalent chromium compound such as sodium bichromate to oxidize the odorous organic impurities present in the CO₂. By means of the after cooling to 2° C., the consumption of sodium bichromate has been reduced to ¼ to ½ lb. per ton of purified CO₂.

*Second example.*—When carbon dioxide from fermentation gas is purified by means of hexavalent chromium compound and sulphuric acid, in most instances the solid carbon dioxide contained sulphuric acid, sometimes one hundred fifty parts per million, thus giving the finished product an acid taste, and sometimes a bluish color. To remove this entrained sulphuric acid by means of coke impregnated with soda ash as specified in my Patent No. 1,519,932 did not give satisfactory results. However, when the gas passed also through a scrubber containing lumps of calcium carbonate, the neutralization was quite satisfactory; but the calcium sulphate formed passed as very fine powder into the compressor, causing a great deal of damage. If, however, the same oil as is used for the lubricating of the CO₂ compressors is being circulated over the limestone, a calcium sulphate free CO₂ is obtained, and the sulphuric acid content in the finished solid carbon dioxide is from 0 to 2 parts per million, and considered by the trade absolutely neutral.

*Third example.*—A combination of the cooling to 2° C., reduced the requirements of the hexavalent chromium compounds at least 75%; consequently, the requirement of the sulphuric acid for the completion of the oxidation has been reduced proportionally, and the addition of an alkali earth scrubber in which an odorless oil circulated in a ratio of one hundred gallons of oil per tower, on a daily capacity of 100,000 lbs. of carbon dioxide. As per this method, the cost of purification for the chemicals has been reduced approximately 75%, and repairs on the compressors became negligible.

I do not limit myself to the specific forms of devices referred to in describing my process, nor to the use of all the steps of the process as varying forms of devices may be used to carry out the different steps of my process, and many changes may be made in the devices particularly described without departing from my invention.

I claim:—

1. In the art of purifying carbon dioxide gas, comprising oxidizing the organic impurities and subsequently passing the gas containing the oxidized impurities through a sulphuric acid scrubbing tower, and then removing the oxidized impurities, the step of passing CO₂ gas, that has passed through the sulphuric acid scrubbing tower, through another scrubbing tower containing a filler composed of an alkaline earth metal compound that reacts with sulphuric acid with the formation of an insoluble sulphate mixed with a neutral oil.

2. The process of purifying impure carbon dioxide gas, containing organic impurities in gaseous form, comprising compressing and cooling the gas to a temperature approximately 0° C., maintaining it at that temperature until a large portion of the condensible organic impurities have separated out, then oxidizing the remaining gaseous impurities by scrubbing it in a solution of a hexavalent chromium compound capable of oxidizing these impurities; scrubbing the gas by passing it through sulphuric acid, and scrubbing out the oxidized impurities and ultimately passing the gas through a mixture of an alkaline earth metal compound that reacts with sulphuric acid to produce sulphates, and oil, whereby the entrained sulphuric acid is neutralized with the elimination of formed sulphates from the carbon dioxide gas.

3. In the art of purifying $CO_2$ gas containing gaseous liquefiable organic impurities, the steps of compressing the gas to a pressure between 50 and 500 lbs., whereby no liquefaction of $CO_2$ occurs, cooling and chilling the same to a point just above the freezing point of water, holding the gas at this temperature and pressure until most of the said organic impurities are liquefied and separated from the gas as unoxidized organic impurities, and then oxidizing the remainder of the organic impurities by scrubbing the gas containing the remaining impurities by passing it through a solution of a hexavalent chromium compound capable of oxidizing these impurities.

4. A process for performing the complete neutralization and removal of volatile or vaporized organic impurities in the purification of carbon dioxide gas, comprising liquefying a large portion of the volatile organic impurities by maintaining a pressure on the gas between 50 and 500 lbs. at a temperature of substantially 0° C. separating the gas from said liquefied impurities and then while said gas is thus chilled and compressed, oxidizing the same by passing the gas through a solution of a hexavalent chromium compound, and then passing the cold compressed gas over an alkaline earth compound of the group consisting of dolomite, limestone and other alkaline earth compounds reactive with sulphuric acid to form an alkaline earth sulphate, and removing the entrained alkali earth sulphates and the oxidation product by means of an odorless oil circulating over an alkaline earth metal compound that reacts with sulphuric acid to produce sulphates.

5. A process for performing the complete oxidation and removal of oxidized organic impurities in the purification of carbon dioxide gas containing vaporized malodorous impurities, comprising maintaining a pressure on said gas of between 50 and 500 lbs. pressure and cooling the same to a temperature of approximately zero centigrade until most of the vaporized impurities are liquefied and deposited, then scrubbing the gas in a solution containing a hexavalent chromium compound thereby further removing said impurities therefrom, and then passing the cold gas over an alkali earth metal compound of the group consisting of limestone, dolomite, and other alkaline earth metal compounds reacting with sulphuric acid over which an odorless oil is circulated with the formation of insoluble alkaline earth sulphates and the retention of same in the oil.

6. The process of purifying $CO_2$ gas by removing therefrom organic malodorous impurities that are contained therein in vapor state when the $CO_2$ is at atmospheric pressure, comprising liquefying these organic impurities by subjecting said gas to a pressure of from 50 to 500 lbs. and chilling it to a temperature substantially of 0° C., maintaining the gas at this temperature and pressure until said liquefied impurities have to a large extent settled out, scrubbing the gas so purified by passing it through an oxidizing medium consisting of a solution of a hexavalent chromium compound whereby the remaining organic impurities are oxidized and then passing the gas containing these oxidized impurities through sulphuric acid.

GUSTAVE T. REICH.